United States Patent [19]
Sandolo

[11] Patent Number: 5,632,449
[45] Date of Patent: May 27, 1997

[54] CUSTOMIZED COFFEE BLENDING APPARATUS

[76] Inventor: Raffael Sandolo, 226 Thayer Pond Rd., Wilton, Conn. 06897

[21] Appl. No.: 630,357

[22] Filed: Apr. 10, 1996

Related U.S. Application Data

[63] Continuation-in-part of Ser. No. 437,176, May 8, 1995.
[51] Int. Cl.$^6$ .................................................. B02C 19/12
[52] U.S. Cl. .......................... 241/34; 241/100; 241/101.6
[58] Field of Search .................................. 241/100, 101.6, 241/101.8, 34

[56] References Cited

U.S. PATENT DOCUMENTS

| | | | |
|---|---|---|---|
| 3,182,919 | 5/1965 | Geerlings | 241/101.6 |
| 4,971,259 | 11/1990 | Nidiffer | 241/34 |
| 5,277,869 | 1/1994 | Glazer et al. | 241/606 X |
| 5,280,859 | 1/1994 | Rust et al. | 241/101.6 |
| 5,458,295 | 10/1995 | Haber et al. | 241/100 |
| 5,462,236 | 10/1995 | Knepler | 241/34 |
| 5,522,556 | 6/1996 | Knepler et al. | 241/34 |

*Primary Examiner*—John M. Husar
*Attorney, Agent, or Firm*—Fattibene and Fattibene; Arthur T. Fattibene; Paul A. Fattibene

[57] ABSTRACT

This disclosure is directed to a custom coffee blending apparatus whereby a customer can personally blend a plurality of different coffee beans to design an individualized blend. This is attained by an apparatus having a plurality of hoppers, each containing a supply of coffee beans that are grown in various coffee producing regions. The discharge opening of the respective hoppers is connected into communication with conduits having disposed therein a feeder for directing the coffee to a collecting station wherein the respective coffee beans received from the respective hoppers are collected and thereafter selectively bagged, either in the whole bean state or in the ground state, weight checked, and/or having a label printed to identify the make up or amount of the various coffees comprising the final coffee blend. The operation of the apparatus is controlled by a central process unit (CPU) that is operated by the individual customer.

8 Claims, 3 Drawing Sheets

CUSTOMIZED COFFEE BLENDING APPARATUS

RELATED APPLICATION

This application is a continuation in part application of my co-pending application Ser. No. 08/437,176 filed May 8, 1995 now pending entitled Blending Apparatus and Method.

FIELD OF THE INVENTION

This invention is directed to a coffee blending apparatus, and more specifically to a coffee blending apparatus whereby the individual or the end purchaser may custom blend coffee to the end purchaser's individual taste.

BACKGROUND OF THE INVENTION

Drinking of coffee has been, for a long time, a popular beverage for many people, and which popularity is steadily increasing. Coffee is grown in many parts of the world, and each such coffee has its own particular taste, flavor and smell. Such coffees have over time been combined by the major coffee manufacturers and coffee roasters into commercial blends. Such blends have been marketed by the major coffee manufacturers as predetermined by the mass producer of such coffee. In view of the increasing popularity of coffee, many coffee drinkers have developed a desire for tastes and blends that are not generally commercially available.

An object of this invention is to provide an apparatus and method whereby an individual purchaser may formulate his or her own personal blend selected from a source comprised of a plurality of different types of coffee beans.

Another object is to provide an apparatus for formulating a coffee blend whereby an individual purchaser may customize his or her personal blend or to vary the blend as the customer may desire.

Another object is to provide in a coffee blending apparatus an improved feeding construction to selectively predetermine the amount and type of coffee for customizing a personalized coffee blend.

Another object is to provide a coffee blending apparatus whereby the customer may select the manner in which the predetermined coffee blend is to be dispensed.

SUMMARY OF THE INVENTION

The foregoing objects and other features and advantages of this invention are attained by a coffee blending apparatus that comprises a plurality of hoppers, each of which contains a supply of coffee beans that were grown in various coffee producing areas or regions, each having its own particular taste and aroma. Each hopper is provided with a discharge opening which is disposed in open communication with a feed conduit. The feed conduits, in communication with each of the individual hoppers, are directed to and discharge into a common collector. Disposed in each of the respective feed conduits is a feed in the form of a coiled rod or screw which is individually and independently driven by a motor whereby the speed or number of turns imparted to the coil feed controls and determines the amount of coffee beans being dispensed from each of the respective hoppers to formulate the desired coffee blend. From the collector, the custom made blend is finally delivered to a point of discharge where it is suitably packaged either in a ground state or a whole bean state, and labeled with the formula of the selected blend. The entire operation of the apparatus, including the selection, weighing of the coffee beans, packaging, and/or grinding is controlled by a central process unit (CPU) which is sequenced by the individual consumer. The CPU program may also include a memory to form a data base of all customers utilizing the blending apparatus whereby a given customer may repeatedly reformulate his or her preferred blend by inputting an appropriate personal code into the CPU.

IN THE DRAWINGS

DETAIL DESCRIPTION

This is a continuation in part application of my co-pending application hereinabove identified and is incorporated by reference herein.

Figure 1:
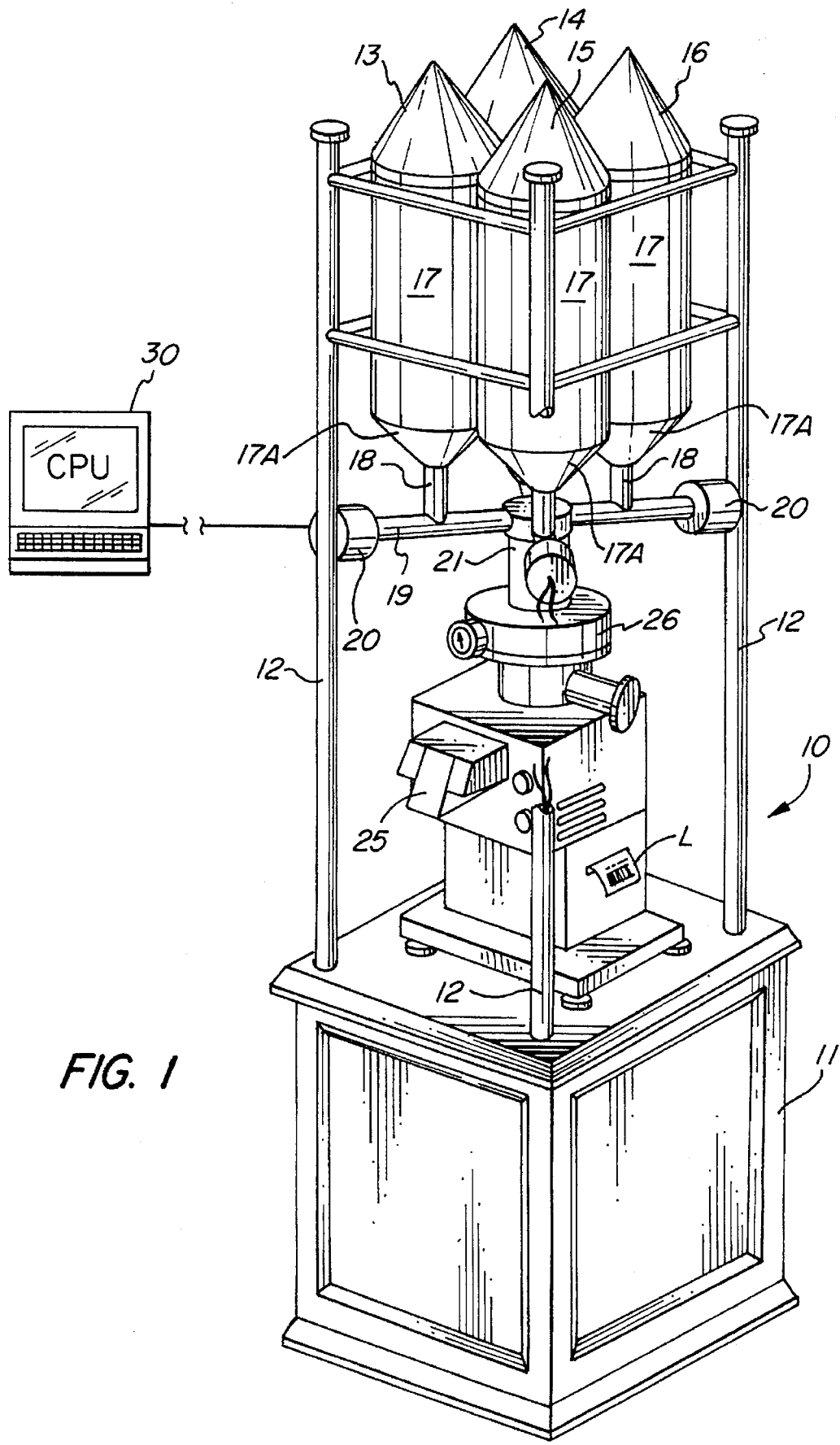
FIG. 1 is a perspective view of a coffee blending apparatus embodying the invention.

Referring to FIG. 1, there is illustrated a coffee blending apparatus 10 embodying the present invention. As shown, the apparatus 10 comprises a base 11 supporting a plurality of hollow uprights 12 rectangularly disposed as shown to define a super structure for supporting the several hoppers 13, 14, 15 and 16. Each of the respective hoppers 13–16 are similarly constructed. Each hopper 13–16 contains a reservoir portion 17 having a bottom wall 17A, which tapers or funnels to a discharge conduit 17A. Each discharge conduit 18 is connected in open communication with a feed conduit 19. One end of the feed conduit 19 connects to a motor housing 20, and the other end of the feed conduit discharges to a central collector 21.

Figure 2:
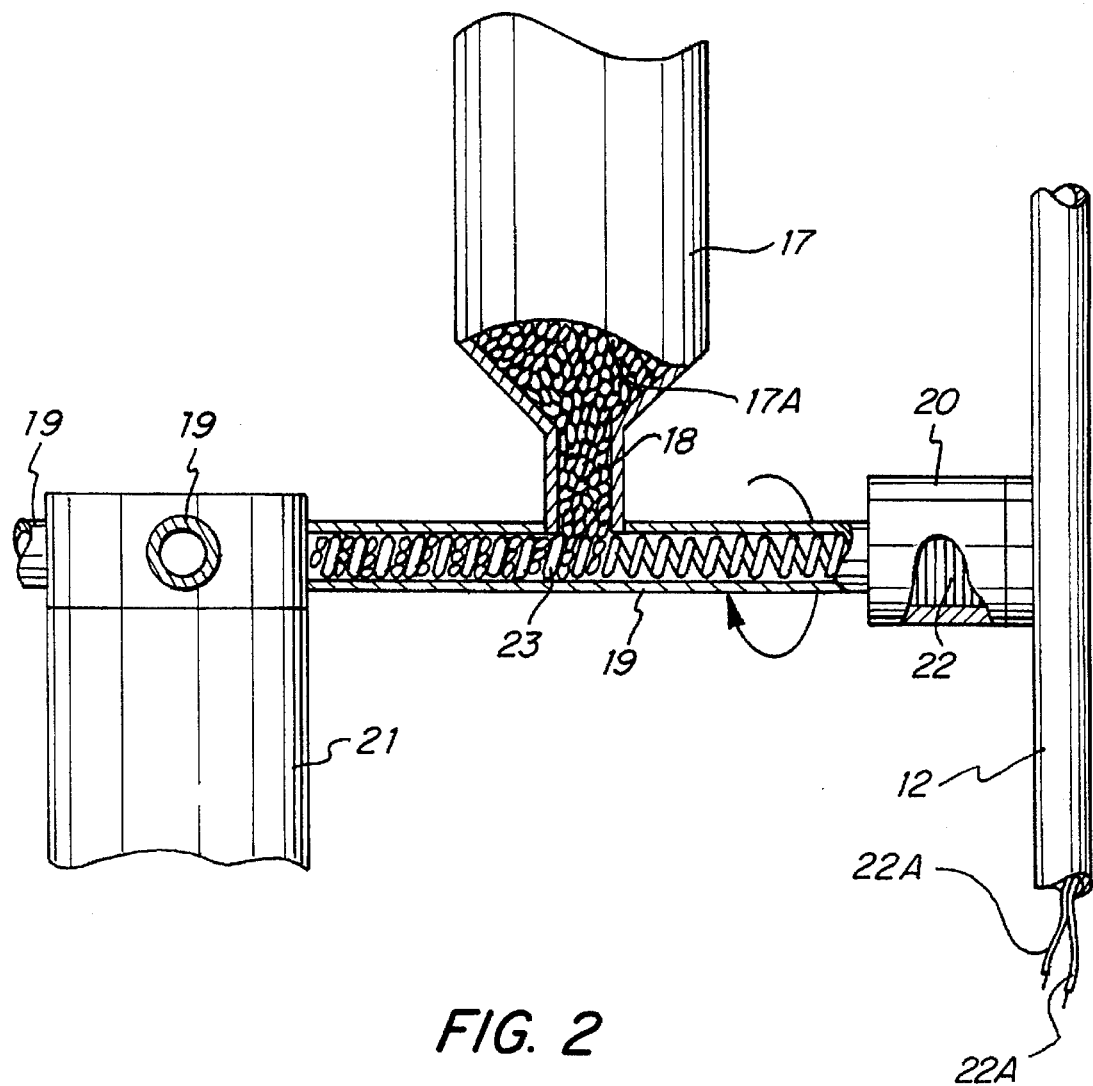
FIG. 2 is an enlarged detail of the blender's feeder arrangement and having parts shown in section.

Disposed within each of the respective motor housing 20 is an electric motor 22, the armature of which is connected to a coil feeder 23. See FIG. 2. The coil feeder 23 comprises a coil, spiral or helically wound heavy gauge wire. As shown, the coiled feeder extends transversely within its respective feed conduit 12 and extends past the junction defined by the conduits 18 and 19, and to the inlet of the collector 21. The electrical conductors 22A connecting the respective motors 22 to a suitable source of electrical power are threaded up through the corresponding upright 12 as best seen in FIG. 2. As it will be hereinafter described, each motor is independently actuated so as to variably control the amount of coffee beans being discharged from the respective hoppers 13, 14, 15 and 16. By controlling the speed of the respective motors 22 and the number of turns of the connected coil feeder 23, the amount of coffee beans being discharged from the respective hopper 13–16 and delivered to the collector 21 can be accurately controlled. The respective coil feeder 23 of each feed conduit 19 is proportioned to receive a predetermined measured amount of coffee beans, and by effecting the rotation of the coil feeder 23, the coffee beans are incrementally advanced toward the collectors 21. Thus, depending upon the respective speeds imparted to each of the coil feeders 23, varying amounts of coffee discharged from the respective hoppers 13, 14, 15 and 16 are conveyed to the collector 21.

In accordance with this invention, the blend of the respective different coffee beans which are directed to the collector 21 may be dispensed to a bagging station 25 where the whole beans may be bagged or packed in a suitable container. Interposed between the bagging station 25 and the collector 21 is a scale means 26. The scale means 26 includes a scale having a valving member which, upon the weighing of the coffee beans received from the collector to check for accuracy of weight, is actuated to direct the beans to either the bagging station or to a grinder 26 where the beans may be ground to various degrees of coarseness according to the selection desired. Upon grinding, the grounds are directed to the bagging station 25 for packaging.

In operation, the customer can make his or her own personal selection of the type and amount of the respective coffee beans necessary to formulate the desired blend, as well as the form in which the coffee blend is to be packaged. This is attained by the customer inputting the desired information in a CPU 30, which is thus programmed to sequence the operation of the respective feed motors 22, scale valve, and the other described function in sequence to produce the customized blend desired by the customer. The CPU 30 is also programmed to print out a label L indicating the weight desired by the customer and the make up of the blend selected by the customer. The CPU also includes with a memory whereby each customer's personal blend is recorded in a data base, so that the customer may reorder his or her own individual custom blend by simply inputting his personalized code in the CPU 30.

Figure 3:
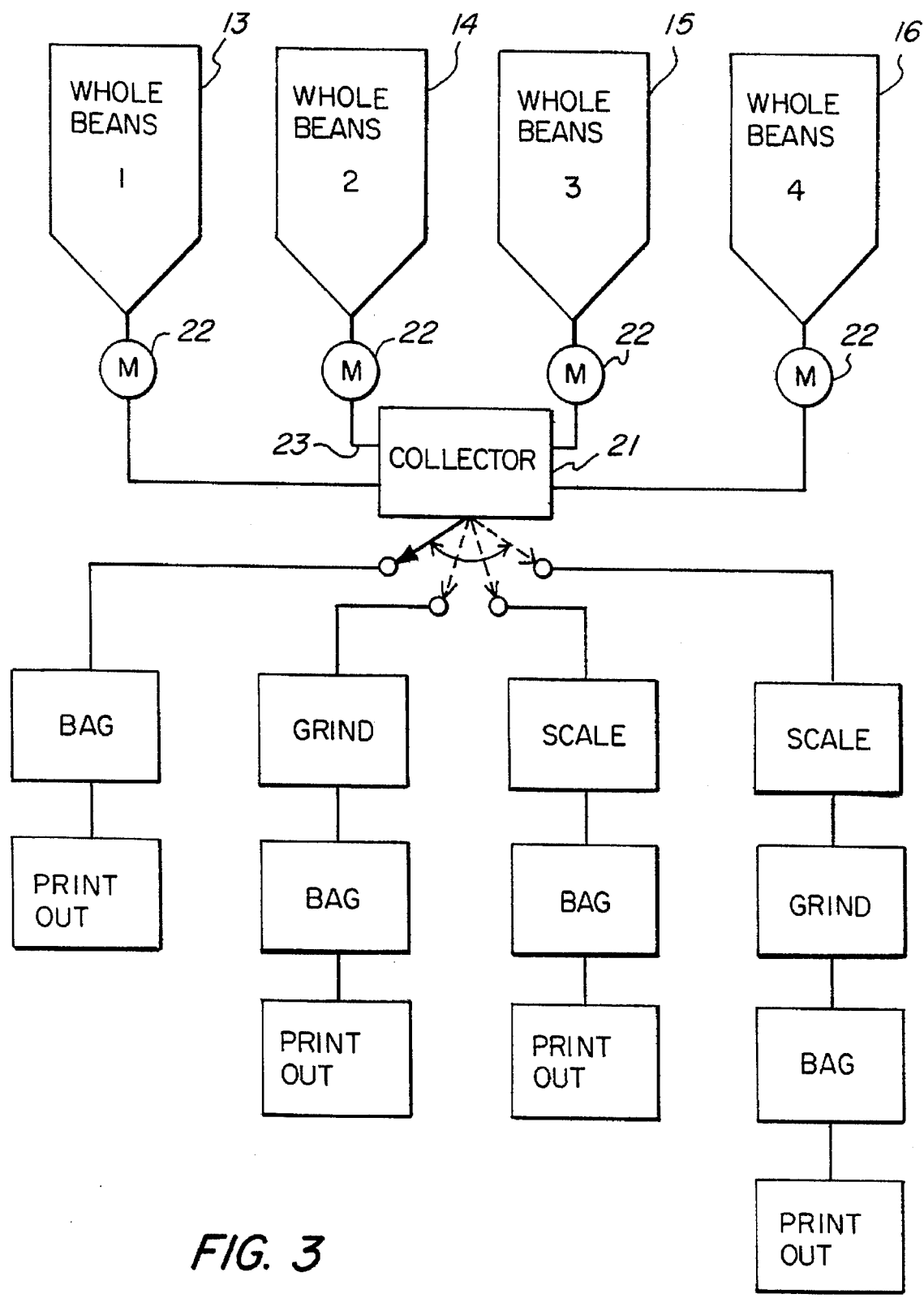
FIG. 3 is a diagrammatical block diagram illustrating the various possible operating selections of the coffee blender.

FIG. 3 diagrammatically illustrates the different selections possible with the described coffee blender 10, depending upon the information that is inputted into the CPU 30. As shown, the proportions or amounts of coffee beans dispensed from the respective hoppers 13–16 respectively is controlled by the preselected speed of the feed motors 22 and connected feed coils 23 as determined by the CPU input information. The customer also has several selections or options. By inputting the desired information in the CPU, the customer can select the program whereby the coffee beans comprising the desired blend can be directly bagged or packaged, and may be ground and bagged, or the blended beans may be weighed and bagged, or the blended beans may be weighed, ground and bagged. The CPU program may also include the printing of a suitable label to indicate the weight of the blend and the specific formula of the blend by indicating the percentage of the varying coffee beans making up the blend.

While the present invention has been described with respect to a particular embodiment, variations and modifications may be made without departing from the spirit and scope of the invention.

What is claimed is:

1. A coffee blender for individualizing a customized blended coffee comprising:

a base, a plurality of hoppers supported on said base, and each of said hoppers forming a supply of a designated coffee bean of a different kind, a discharge conduit connected to each of said hoppers through which the coffee bean supplied therein is discharged, a feed conduit connected in communication with each of said discharge conduits, a collector, each of said feed conduits being connected to said collector, a feed means, said feed means including a feeder disposed in each of said feed conduits, and a motor for driving said feeder, whereby said feeder conveys a predetermined amount of coffee from said discharge conduit to said collector depending upon the speed of the motor driving said feeder.

2. A coffee blender as defined in claim 1 wherein said feeder comprises a helical coil, said helical coil extending beyond the intersection of said discharge conduit with said feed conduit.

3. A coffee blender as defined in claim 2 and including a grinder connected in communication with said collector, a bagging station connected in communication with said grinder and said collector, and program means for selectively directing the coffee beans in said collector to either said grinder or said bagging station.

4. A coffee blender as defined in claim 3 and including a scale interposed between said collector and said bagging station for checking the weight of the coffee received in said collector.

5. A coffee blender as defined in claim 4 wherein said program means includes a central process unit programmed to sequentially actuate said feeders, scale, grinder and bagging station in accordance with a signal input selected by a purchaser.

6. A coffee blender as defined in claim 5 wherein said CPU being programmed to print a label containing the formula of the blend selected by a customer.

7. A coffee blender as defined in claim 6 and wherein said CPU includes a memory for recording each customer's blend in a data base whereby a customer may duplicate the personalized blend by inputting a personalized code.

8. A coffee blending apparatus for individualized blending of several different coffees grown in the various coffee producing regions comprising:

a base, a plurality of hollow uprights supported on said base, a plurality of hoppers supported on said uprights, each of said hoppers having a discharge conduit, a feed conduit disposed in communication with each of said discharge conduits, a collector, each of said feed conduits having one end connected to said collector, a motor connected to the other end of each of said feed conduits, a feeder disposed in each of said feed conduits, said feeder comprising a helical coil having one end connected to its corresponding motor, said coil extending beyond the intersection of said discharge conduit and feeder conduit for advancing the beans discharged from its corresponding chopper to said collector, when the corresponding motor is actuated, a grinder connected to said collector, and a bagging station, a scale means interposed between said collector and said bagging station, said scale means including a valve means for selectively directing the coffee beans weighed thereby to either said grinder or bagging station, a central processing unit for controlling the actuation of said motors to control the type and amount of coffee beans dispensed from each of said hoppers in accordance to the selection made by the purchaser.

* * * * *